UNITED STATES PATENT OFFICE.

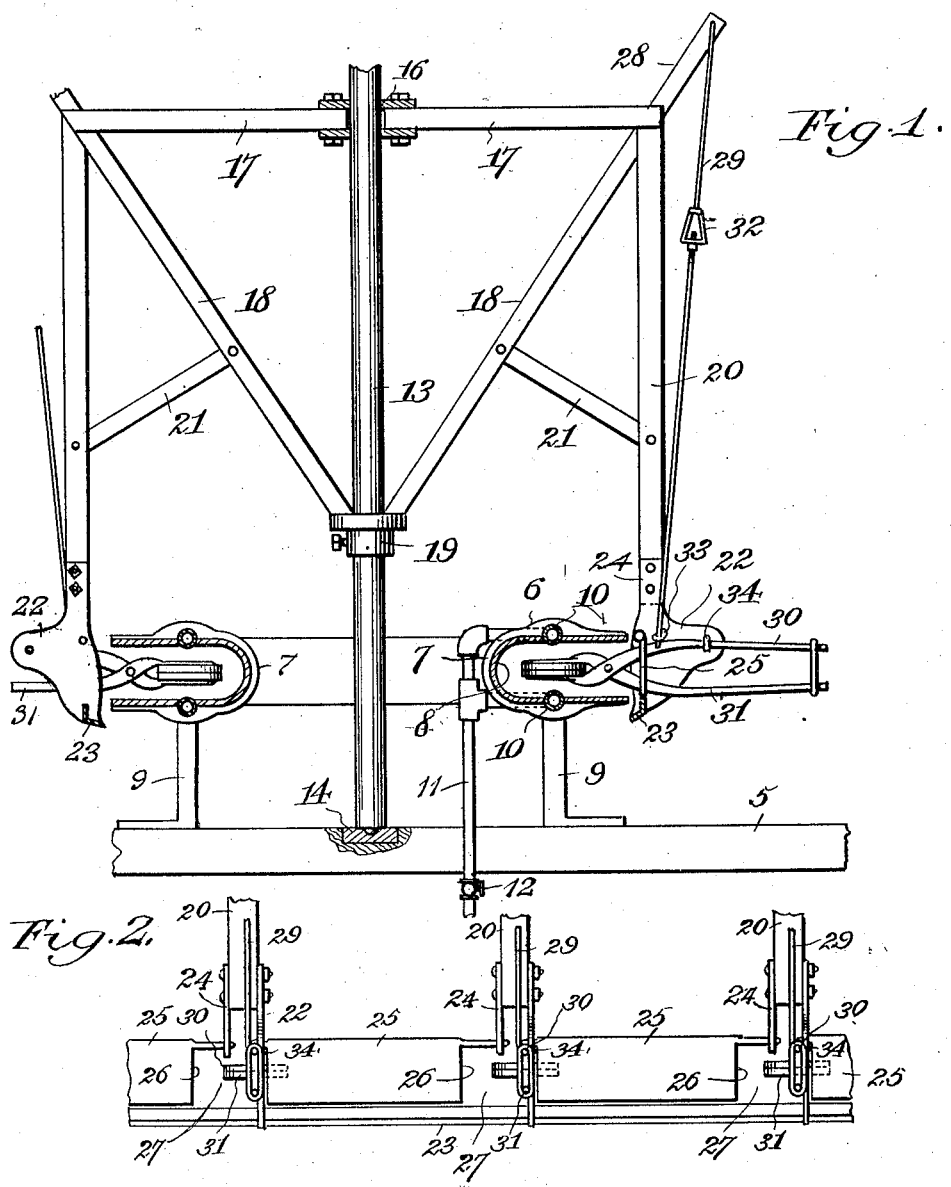
M. HIGUCHI.
RICE CAKE BAKING APPARATUS.
APPLICATION FILED AUG. 19, 1919.
1,330,706.
Patented Feb. 10, 1920.
INVENTOR,
BY Monnosuke Higuchi
Victor J. Evans,
ATTORNEY.

MONNOSUKE HIGUCHI, OF COLLEGE POINT, NEW YORK.

RICE-CAKE-BAKING APPARATUS.

1,330,706.  Specification of Letters Patent.  Patented Feb. 10, 1920.

Application filed August 19, 1919. Serial No. 318,464.

*To all whom it may concern:*

Be it known that I, MONNOSUKE HIGUCHI, a citizen of Japan, residing at College Point, in the county of Queens and State of New York, have invented new and useful Improvements in Rice-Cake-Baking Apparatus, of which the following is a specification.

This invention relates to improvements in rice cake baking apparatus and has for its principal object to provide a device for timing the baking of the cakes to insure the proper browning of the same and to permit of the rapid baking of such cakes by enabling the operator to maintain all of the baking irons in operation.

Another object of the invention resides in the provision of a novel oven in which the heat is distributed both from the top and bottom of the oven thereby insuring that the finished article will be thoroughly baked.

A further object of the invention is to provide the oven with doors so as to prevent the escape of heat therefrom thereby increasing the efficiency of the device and permitting its operation on an economical scale.

With the above and other objects in view the invention consists in the novel construction, combination and arrangement of parts which will be fully set forth in the following specification, claimed as illustrated in the accompanying drawings in which:—

Figure 1 is an enlarged vertical sectional view through a portion of the device, and Fig. 2 is a fragmentary side elevation of a portion of the device.

Generally stated the device consists of a circular oven having an open outer side, a plurality of cake irons which are revolubly supported in a manner so that said irons are disposed within the oven so that they may travel around in a circular path therein. The device is to be supported upon a suitable structure which will include cross bars or the like 5 in the nature of a table or support for the oven and the means for revolubly supporting the cake irons.

An oven 6 comprising a plurality of U-shaped brackets 7 which support heat insulating oven walls 8 is supported in spaced relation to the table 5 by means of legs 9, and as illustrated in Fig. 13, the oven is provided with a pair of burners 10, one of which is disposed in the lowermost portion of the wall 8, while the opposite burner is supported in the uppermost wall and directly over the first mentioned burner. As will be readily seen upon reference to the drawing, the oven 6 is of circular formation with the open side disposed outwardly in order to readily receive the rice cake irons. The burners 10 are connected to a suitable fuel inlet pipe 11 and a valve 12 is arranged in said pipe to control the supply of fuel to the burners.

Extending vertically through the frame and arranged centrally of its longitudinal axis is a shaft 13, the lower end of which is rotatably mounted in a suitable bearing 14, arranged centrally of the table. The upper end of said shaft is journaled in a cross piece 15 extending diagonally of the frame at or near its upper end. Secured near the upper end of the shaft 13 is a collar 16 provided with outwardly extending annular flanges between which are secured radially extending supporting bars 17, to the outer ends of which are secured, downwardly and inwardly extending braces 18 having their lower ends supported upon a suitable collar 19 attached to the shaft. Suspended from the outer ends of the bars 17 are vertically extending arms 20 which are rigidly supported by a suitable brace 21 and carry at their lower ends, brackets 22, the use of which will be more fully hereinafter set forth.

The extreme lower terminals of these brackets are connected by cross pieces 23 and it will thus be seen that the lower terminals of the arms 20 will be retained in spaced relation, thereby maintaining the arms parallel to each other throughout their entire length. Secured to the sides of the arms 20, opposite those to which the brackets 22 are secured are hanger plates 24, which coöperate with the brackets in pivotally supporting the oven doors 25. As shown in the drawing, the end of each door adjacent each hanger 24 is spaced inwardly as at 26 to provide an opening 27 for the accommodation of the handles of the irons when in the position shown in Fig. 1.

Formed on the upper ends of the braces 18 are extensions 28 to which are connected movable hangers 29, the lower ends of which are attached to one handle 30 of the cake irons designated in their entirety by the character 31. A suitable adjusting element 32 is arranged intermediate the upper and lower end of each flexible member 29 for an obvious purpose. In order to retain the irons in proper position within the oven the brackets 22 are provided with hooks 33 and 34 which respectively engage the flexible members 29 and the handles 30 of the cake irons 31.

In operation it will be seen that a plurality of irons is hung on the movable hangers 29 and the oven burners are lighted, after which the user fills the irons successively and hangs them on the brackets 22 in the manner illustrated in Fig. 1, thus disposing the cake mold portions of the irons in the space between the upper and lower walls of the oven. It will be obvious that the irons may be filled at a point at one side of the machine and that the irons and their supporting elements may be caused to rotate on the shaft 13 thereby causing the irons to make a complete circuit of the oven. The cakes are removed from the irons at the same point the irons are filled and it will be obvious that the regulation of the fuel to the oven must be governed so that a single revolution of the irons in the apparatus will be sufficient to thoroughly bake the cakes.

While in the foregoing there has been shown and described the preferred embodiment of this invention, it is to be understood that certain minor changes in the construction, combination and arrangement of parts may be resorted to without departing from the spirit and scope of this invention as claimed.

What is claimed as new is:—

1. In a device of the class described, a circular oven having an open outer side, a plurality of cake irons adapted to be disposed within the oven, means to heat the oven, means revolubly supporting the irons within the oven and doors for the oven.

2. In a device of the class described, a circular oven having an open outer side, a plurality of cake irons adapted to be disposed within the oven, means to heat the oven, means revolubly supporting the irons within the oven and doors carried by the iron supporting means.

3. In a device of the class described, a circular oven having an open outer side, means to heat the oven, cake irons adapted to be supported within the oven, a shaft extending vertically and revoluble means on the shaft upon which the cake irons are suspended in position to travel around within the oven.

4. In a device of the class described, a circular oven having an open outer side, burners for heating the oven, means for feeding fuel to the burners, a shaft extending vertically and centrally of the oven, a revoluble support on the shaft, doors carried by the support for closing the outer side of the oven, and cake irons suspended from the revoluble support and adapted to travel around within the oven.

5. In a device of the class described, a substantially transversely U-shaped circular oven having its open side disposed outwardly, a shaft extending vertically and centrally of the oven, a revoluble carriage on the shaft, arms depending therefrom, doors supported at the lower ends of the arms for closing the open side of the oven, and cake baking irons suspended from the carrier and adapted to be disposed within the oven and travel around in a circular path therein.

In testimony whereof I have affixed my signature.

MONNOSUKE HIGUCHI.